(12) United States Patent
Riley et al.

(10) Patent No.: US 7,463,899 B2
(45) Date of Patent: Dec. 9, 2008

(54) METHODS AND APPARATUS FOR DETECTING LOCAL MAXIMUMS IN A TWO-DIMENSIONAL DATA SET

(75) Inventors: Robert Riley, Escondido, CA (US); Huey Trando, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 790 days.

(21) Appl. No.: 10/830,187

(22) Filed: Apr. 21, 2004

(65) Prior Publication Data

US 2005/0249299 A1 Nov. 10, 2005

(51) Int. Cl.
*H04B 7/00* (2006.01)
(52) U.S. Cl. ............... 455/514; 455/423; 455/430; 375/262; 375/341
(58) Field of Classification Search ............ 455/514, 455/67.13, 67.14, 3.02, 424, 430, 423; 375/262, 375/341; 370/335, 342; 702/22; 708/700; 382/136, 135, 154
See application file for complete search history.

(56) References Cited

U.S. PATENT DOCUMENTS

| | | | |
|---|---|---|---|
| 2003/0067898 A1* | 4/2003 | Challa et al. | 370/335 |
| 2005/0209789 A1* | 9/2005 | Hastings | 702/22 |
| 2005/0210095 A1* | 9/2005 | Lutz et al. | 708/700 |

FOREIGN PATENT DOCUMENTS

| | | |
|---|---|---|
| EP | 1115056 | 7/2001 |
| EP | 1379010 | 1/2004 |

OTHER PUBLICATIONS

Anoymous. "Maxima and Minima". Aug. 17, 2003. http://en.wikipedia.org/w/index/php?title=Maxima_and_minima&direction=prev&oldid=1303495.
International Search Report-PCT/US2005/011317, International Search Authority/European Patent Office, Jul. 5, 2005, (3 pages).
Written Opinion of the International Searching Authority, PCT/US2005/011317, International Search Authority/European Patent Office, Jul. 5, 2005, (5 pages).
International Preliminary Examination Report, PCT/US2005/011317, IPEA/US, Aug. 21, 2007. (3 pages).

* cited by examiner

*Primary Examiner*—Tan Trinh
(74) *Attorney, Agent, or Firm*—Ashish L. Patel; Thomas Rouse (57) ABSTRACT

Methods and apparatus for detecting local maximums in a two-dimensional data set. Apparatus is provided for detecting a local maximum in a two-dimensional data set, where a stream of data elements represents the data set. The apparatus includes first detection logic that receives the data stream and operates to detect a first data element that represents a peak in a first dimension of the data set. The apparatus also includes second detection logic that receives the data stream and operates to detect a second data element that represents a peak in a second dimension of the data set, wherein a local maximum is detected if the first and second data elements are the same element.

42 Claims, 6 Drawing Sheets

METHODS AND APPARATUS FOR DETECTING LOCAL MAXIMUMS IN A TWO-DIMENSIONAL DATA SET

BACKGROUND

I. Field

The present invention relates generally to signal processing systems, and more particularly, to a system for detecting local maximums in a two-dimensional data set.

II. Description of the Related Art

Telecommunications is one area where signal processing has become especially important. For example, in a wireless telecommunications network based on code division multiple access (CDMA) technology, a large number of users communicate within the network using a variety of wireless devices that are sometimes referred to as terminals. These terminals include wireless telephones, pagers, email devices, personal digital assistants (PDA), and others.

The network uses data encryption and sophisticated base station receivers to allow communication services to be provided to selected terminals within a predetermined area, or cell. For example, transmissions from each terminal in a cell may be uniquely encoded and transmitted to a base station receiver. In order to receive the transmitted information, the receiver may be tuned for each transmitting terminal to filter out unwanted noise. To accomplish this, the receiver may process the received transmissions to produce a two-dimensional data array, sometimes referred to as a "search space." One example of a search space provides the received transmissions in a two-dimensional data array where energy values in selected frequencies are associated with variations in a decoding sequence.

Typically, the search space includes local data maximums (peaks) that correspond to a frequency and a decoding sequence variation that are associated with a particular transmitting terminal. By detecting local peaks (i.e., frequency and sequence) in the two-dimensional data array, it is possible to use this information to tune the receiver to accurately receive data transmissions from selected transmitting terminals.

Current communication systems store the two-dimensional data array in a memory and repeatedly access the memory to compare data elements with their neighbor elements to detect local peaks. For example, if one wants to determine if a particular element of the two-dimensional array is a local maximum, then that element is compared to its four surrounding neighbor elements. This results in at least five memory accesses, which may be duplicated when detecting whether or not any of the neighbor elements represent local peaks in the data array. Thus, current systems are very inefficient because they require duplicate memory accesses to detect local peaks in the data array. This operation is especially problematic if the system is utilizing memory having a relatively slow bandwidth. For example, the amount of data is generally too large to store in a cache memory or register bank, and the bandwidth of external memory is typically much slower than internal memory.

Therefore, what is needed is a system that operates to efficiently detect local maximums in a two-dimensional data array without performing duplicate memory accesses as required by current systems.

SUMMARY

In one or more embodiments, a peak detection system is provided that operates to detect local maximums in a two-dimensional data array. The system is suitable for use in any type of system where it is necessary to detect local data maximums in a data array while conserving memory bandwidth. In one embodiment, the system reads the data elements of a two-dimensional data array out of a memory in row or column order, which results in the data taking on a streaming characteristic. The data then undergoes a series of delays that take advantage of the structure of the two-dimensional array to allow the data elements to be easily compared to detect local maximums. The detection system operates to utilize memory bandwidth very efficiently because the data elements of the array are read out of the memory only once. Thus, the system is suitable for use with any type communication system that needs to detect local maximums in a search space to tune a receiver.

In one embodiment, apparatus is provided for detecting a local maximum in a two-dimensional data set, where a stream of data elements represents the data set. The apparatus comprises first detection logic that receives the data stream and operates to detect a first data element that represents a peak in a first dimension of the data set. The apparatus also comprises second detection logic that receives the data stream and operates to detect a second data element that represents a peak in a second dimension of the data set, wherein a local maximum is detected if the first and second data elements are the same element.

In another embodiment, apparatus is provided for detecting a local maximum in a two-dimensional data set, where a stream of data elements represents the data set. The apparatus comprises means for receiving the data stream, and means for detecting a first data element that represents a peak in a first dimension of the data set. The apparatus also comprises means for detecting a second data element that represents a peak in a second dimension of the data set, wherein a local maximum is detected if the first and second data elements are the same element In another embodiment, a method is provided for detecting a local maximum in a two-dimensional data set, where a stream of data elements represents the data set. The method comprises receiving the data stream, and detecting a first data element in the data stream that represents a peak in a first dimension of the data set. The method also comprises associating a flag with the first data element, and detecting a second data element in the data stream that represents a peak in a second dimension of the data set. The method also comprises detecting a local maximum if the flag is associated with the second data element.

In yet another embodiment, a computer-readable media is provided that comprises instructions, which when executed by a processor, operate to detect a local maximum in a two-dimensional data set, wherein the data set is represented by a stream of data elements. The computer-readable media comprises instructions for receiving the data stream, and instructions for detecting a first data element that represents a peak in a first dimension of the data set. The computer-readable media also comprises instructions for detecting a second data element that represents a peak in a second dimension of the data set, wherein a local maximum is detected if the first and second data elements are the same element.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes a peak detection system, including methods and apparatus for detecting local maximums in a data array. It should be understood that the described peak detection system could also be used in conjunction with virtually any type of data processing system including, but not limited to, wireless communication systems, wired communication systems, telecommunication systems, networking systems, or any other type of system where detection of local maximums in a data set is needed.

Figure 1:
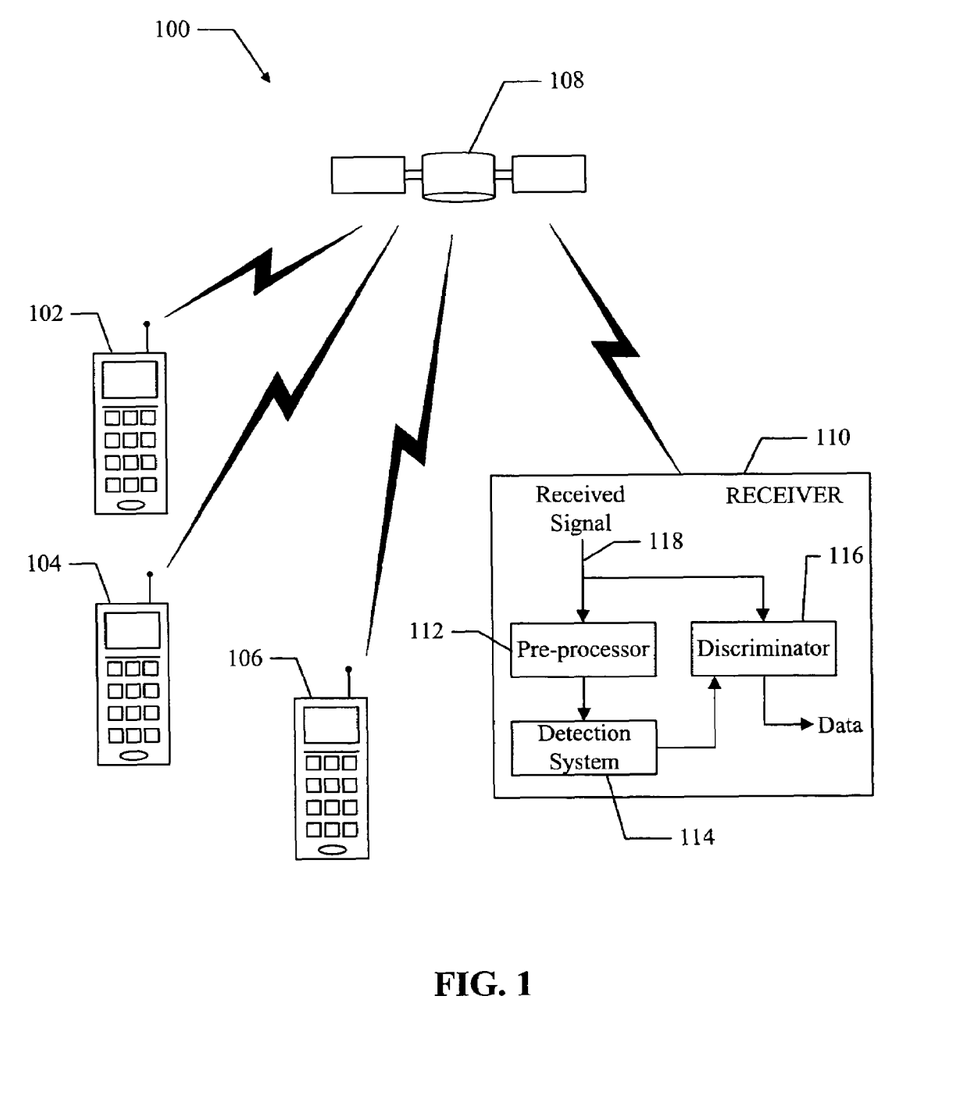
FIG. 1 shows a communication system that includes one embodiment of a detection system that operates to detect local maximum in a data array.

FIG. 1 shows a communication system 100 that includes one embodiment of a peak detection system that operates to detect local maximums in a data array. The communication system 100 comprises a satellite 108 that is in communication with terminals 102, 104, and 106. The satellite 108 receives signals transmitted from the terminals 102, 104, and 106, and re-transmits these signals to a receiver 110.

In one embodiment, the system 100 operates using CDMA technology so that data from the transmitting terminals 102, 104, 106 is encoded and spread to look like a noise signal. Thus, it is the job of the receiver 110 to decode the received noise signals to obtain the transmitted data. It should be noted that the system 100 represent just one configuration and that other configurations are possible. For example, in another configuration, the terminals 102, 104, 106 communicate directly with the receiver 110.

The receiver 110 comprises a signal pre-processor 112 that receives the signals transmitted from the satellite 108. The pre-processor operates to process the received signals 118 and form a data array that represents the data transmitted from the terminals 102, 104, and 106. The data array is input to one embodiment of a peak detection system 114 that operates to detect local maximums in the data array. After the local maximums are detected, the detection system 114 transmits information about the detected local maximums to a discriminator 116. The discriminator 116 uses the information to process the received signals so that data transmitted from each terminal (102, 104, 106) can be recovered from the received signals.

The system 100 in this example comprises a satellite communication system, however, embodiments of the peak detection system 114 are suitable for use with ground-based communication systems, or any other type of processing system that needs to determine local maximums in a data set.

Figure 2:
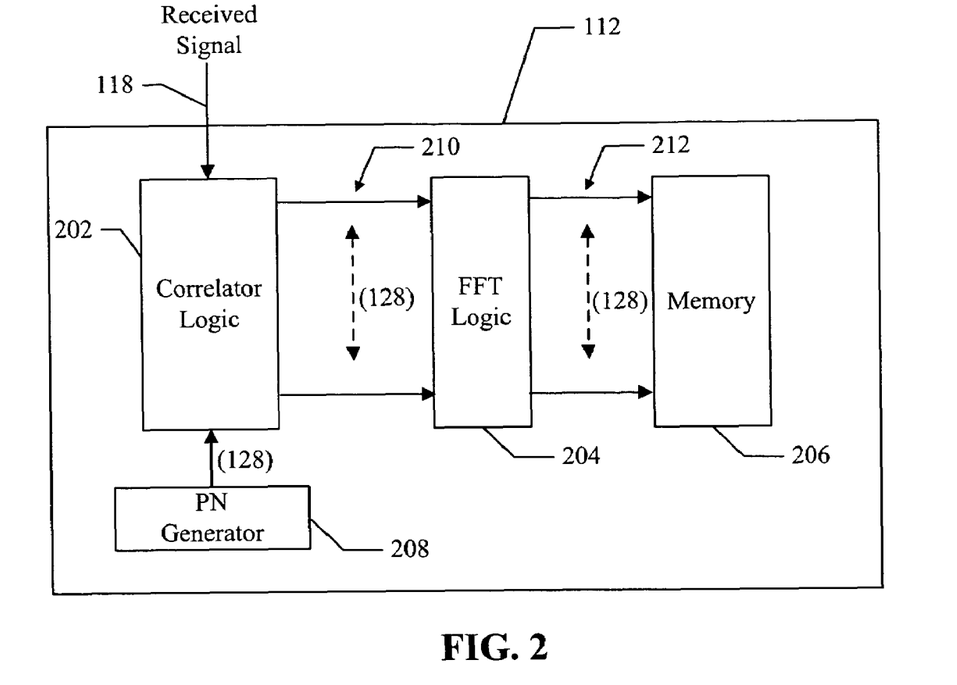
FIG. 2 shows a functional diagram of one embodiment of a signal pre-processor.

FIG. 2 shows a functional diagram of one embodiment of the pre-processor 112. The pre-processor 112 comprises correlator logic 202, Fast Fourier Transform (FFT) logic 204, memory 206, and pseudorandom noise (PN) generator 208.

It should be understood that the elements of the pre-processor 112 shown in FIG. 2 are for illustrative purposes only, and that implementation of the pre-processor 112 could be achieved in one of any number of ways using greater or fewer functional elements. For example, the correlator logic 202, FFT logic 204, and PN generator 208 could all be implemented in a computer program executed by one or more processors.

During operation of the pre-processor 112, the correlator 202 correlates the received signals 118 with pseudorandom noise sequences generated by the PN generator 208. For example, in one embodiment, the PN generator 208 generates 128 PN sequences that are correlated with the received signals 118 by the correlator 202. However, is should be noted that the any number of sequences can be generated to correlate with the received signals.

The correlator 202 produces 128 correlated sequences 210 that are input to the FFT logic 204. The purpose of correlator is to unscramble the data, but the frequency of data still needs to be determined. The FFT logic 204 performs FFTs on the input sequences and produces 128 FFT outputs that are stored in the memory 206. For example, the FFT logic 204 transforms the input sequences 210 to frequency domain signals 212. For example, in one embodiment, the FFT logic 204 transforms an input sequence into 1024 bins where the value associated with each bin represents the energy at a particular frequency. For example, the overall bandwidth is divided by the number of bins to determine the bandwidth represented by each bin.

Thus, as a result of the operation of the correlator 202, PN generator 208, and FFT logic 204, the memory 206 contains a two-dimensional data set that represents the frequency energy of the received signals after being correlated with selected PN sequences. This two-dimensional data set includes local maximums that represent transmitted energy from one or more transmitting terminals. In one or more embodiments, the detection system described herein operates to detect local maximums so that the data transmitted from the transmitting terminals can be received and recovered. For example, the local maximums correspond to the frequency and sequence variations associated with transmitting terminals. This information is used to tune the receiver to accurately receive data transmitted from the terminals.

Figure 3:
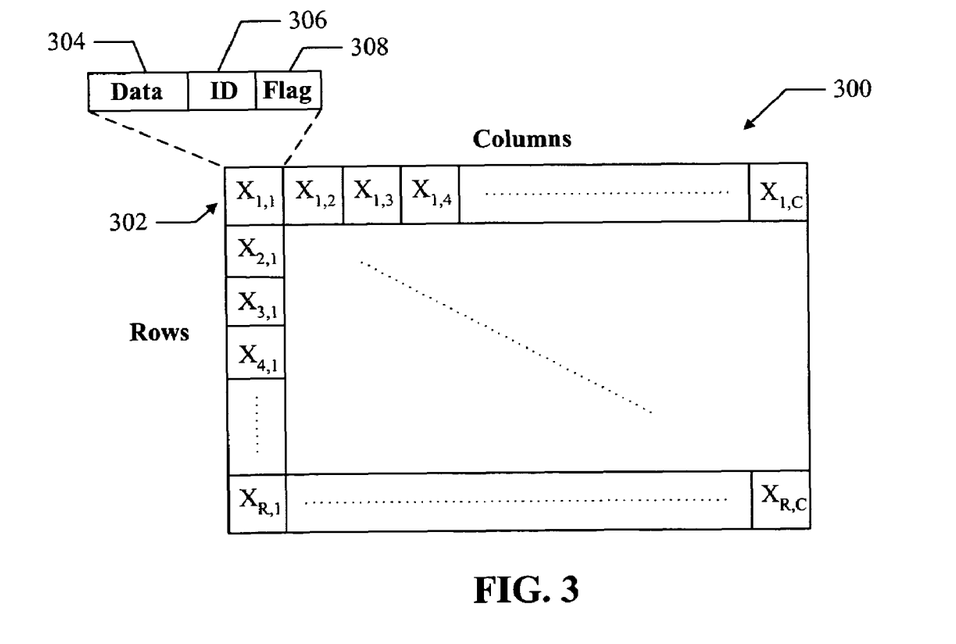
FIG. 3 shows a data array produced by the preprocessor shown in FIG. 2.

FIG. 3 shows a data array 300 produced by the preprocessor 112 and stored in the memory 206. The data array 300 comprises a number of Rows (R) and Columns (C), where each element in the data array represents energy in a selected frequency region (bin) for one of the correlated sequences 210 output from the correlator logic 202. For example, there are as many Rows as correlation output sequences 210, and within each row, the Columns represent frequency regions. In one embodiment, there are 128 correlation sequences 210 and 1024 frequency bins per FFT output 212, and so the array 300 includes 128 Rows and 1024 columns.

In one embodiment, each element of the data array 300 comprises a data element that is 32-bits wide. For example, one data element is illustrated by data element 302, which is located at (1,1) in the data array 300. The element 302 comprises a data portion 304, an identifier (ID) 306, and a flag 308. The data portion 304 represents the energy determined by the FFT logic 204 for that frequency bin of that sequence. The ID 306 represents the location of the element in the data array 300. For example, the ID indicates the frequency bin and sequence number of the data element. This information is used by the detection system to determine the location of detected local peaks in the data array 300. The flag 308 is used by the detection system during the process of detecting local maximums and its purpose is discussed in more detail in another section of this document.

Figure 4:
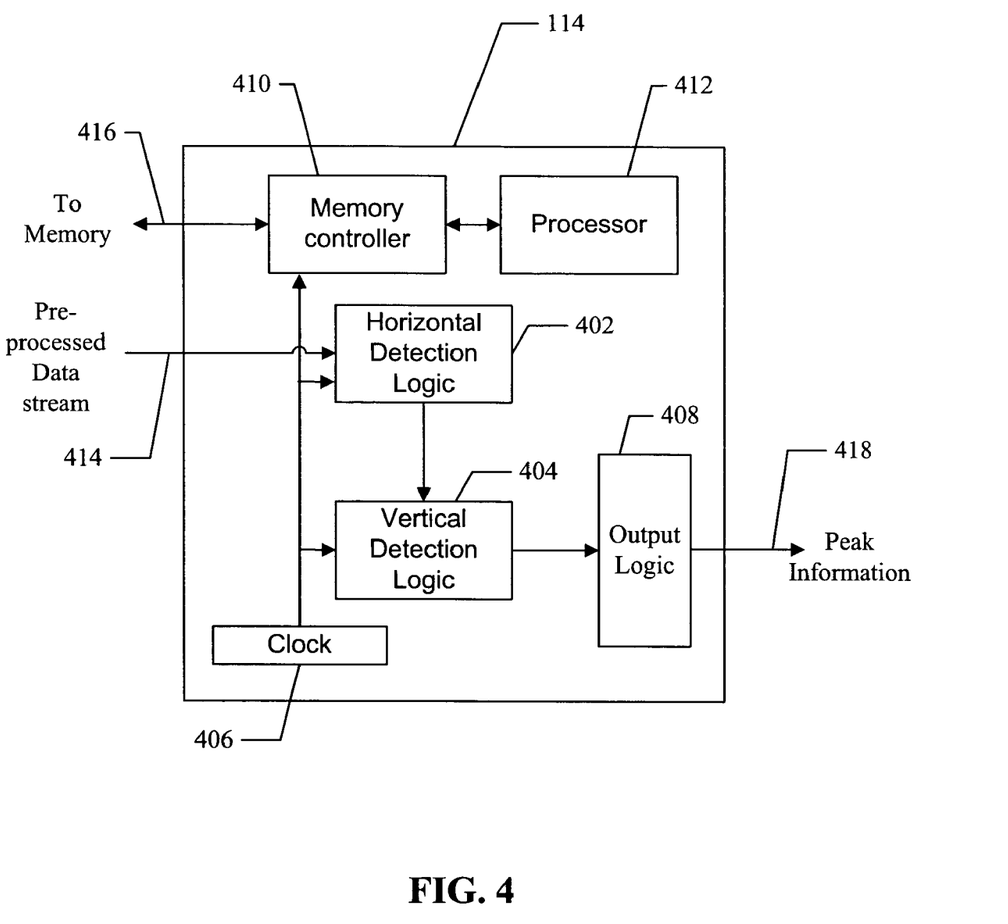
FIG. 4 shows one embodiment of a detection system to detect local maximums in a two dimensional data array.

FIG. 4 shows one embodiment of the peak detection system 114 that operates to detect local maximums in a two-dimensional data array. The detection system comprises horizontal detection logic 402, vertical detection logic 404, a clock 406, and output logic 408. The system 114 also comprises a memory controller 410 and a processor 412.

The memory controller 410 and the processor 412 operate to access a data array stored in a memory, for example the array 300. In one embodiment, the processor 410 comprises a CPU, gate array, hardware logic, software, or any combination of hardware and software. The memory controller 410 comprises any suitable hardware and/or software to allow the system 114 to access a data array via the control signal 416. The clock 406 is used to synchronize the operation of the detection system 114. For example, the memory controller 410 accesses a memory to readout the two-dimensional data array in the form of a pre-processed data stream 414. For example, with reference to the data array 300, the data is read out element by element across one row and then proceeding down to the next row. Thus, the pre-processed data stream 414 is formed.

The horizontal detection logic 402 processes the pre-processed data stream 414 to detect local maximums in one dimension. For example, one dimension (horizontal) is defined to represent the data along each row of the data array 300. The horizontal detection logic 402 operates to detect local maximums by comparing adjacent row elements in the data stream 414 and flagging any data elements in the data stream 414 that are detected as horizontal maximums.

After processing by the horizontal detection logic 402, the preprocessed data stream then flows to the vertical detection logic 404. The vertical detection logic 404 processes the pre-processed data stream 414 to detect local maximums in another dimension referred to as the vertical dimension. For example, with reference to the data array 300, each column represents the vertical dimension and the vertical detection logic 404 detects local maximums down each column. In one embodiment, the vertical detection logic 404 utilizes delay elements so that adjacent elements within each column of the data array can be compared to each other and local maximums in the vertical dimension can be detected.

Once local maximums in the horizontal and vertical directions have been detected, the information is passed to the output logic 408. The output logic 408 receives information about which elements of the preprocessed data stream are local maximums in both the vertical and horizontal dimensions. For example, if a data element is found to be a local maximum by the horizontal detection logic 402, then a flag associated with that data element is set. If that same data element is found to be a local maximum by the vertical detection logic 404, the flag associated with that element is tested. If the flag is set, information about that data element is sent to the output logic. For example, peak information including the data value and its identifier is sent to the output logic 408, which forwards the peak information 418 to the next stage of the receiver, i.e. the discriminator. Thus, the detection system operates to detect local maximums in a data array, and provide the detected peak information to the next stage of a receiver.

Figure 5:
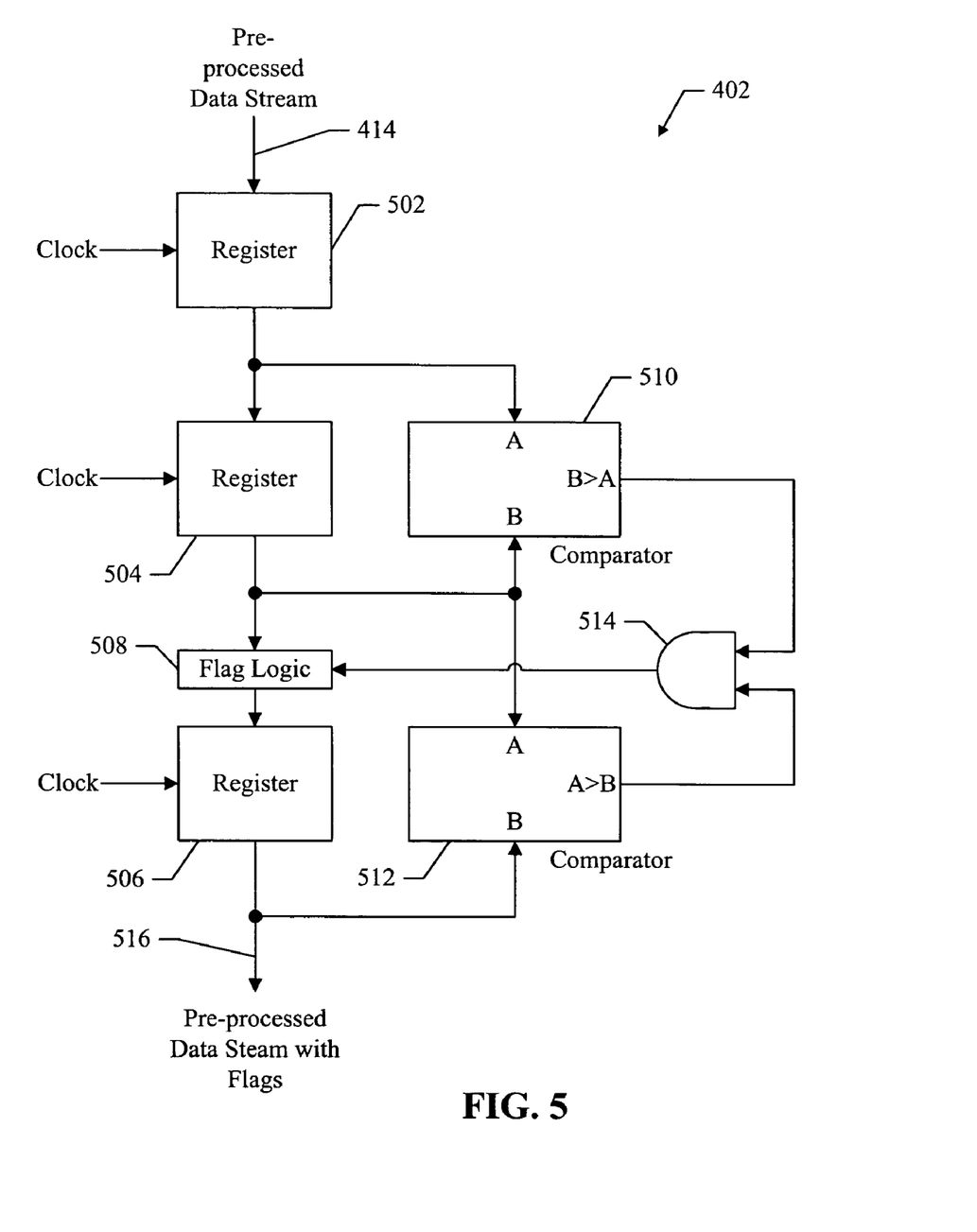
FIG. 5 shows a detail diagram of one embodiment horizontal detector for use in one embodiment of a peak detection system.

FIG. 5 shows a detail diagram of one embodiment the horizontal detector 402 for use in one embodiment of a peak detection system. The horizontal detector 402 comprises registers 502, 504, 506, comparators 510, 512, AND logic 514, and flag logic 508.

The registers 502, 504, 506 preferably comprise hardware but may comprise hardware, software, or any combination thereof. The registers 502, 504, 506 each provide storage for one data element of the pre-processed data stream 414. The registers 502, 504, 506 all receive a clock signal derived from the clock 406 so that the registers operate in a synchronous fashion.

The comparators 510, 512 preferably comprise hardware, but may comprises hardware, software, or any combination thereof. The comparators 510, 512 have inputs "A" and "B" to receive values that are compared to each other to produce an output. The comparator 510 produces an output value of "1" if the value at its B input is greater than the value at it's A input (B>A). The comparator 512 produces an output value of "1" if the value at it's A input is greater than the value at its B input (A>B).

The outputs of the comparators are input to the AND logic 514, which produces an output value of "1" if both inputs are "1." The output value from the AND logic 514 is input to the flag logic 508.

During operation of the horizontal peak detector 402 the pre-processed data stream 414 is input to the register 502. Clock pulses provided by the clock signal cause the pre-processed data stream 414 to sequentially shift through the registers 502, 504, and 506. After each shift, the comparators 510, 512 compare adjacent data values in the pre-processed data stream 414. If the data value stored at register 504 is greater than the values stored at registers 502 and 506, then a horizontal peak is detected. The comparators 510 and 512 output values of "1" that cause the AND logic 514 to output a value of "1." The output from the AND logic 514 is input to the flag logic 508, which operates to set a flag that is associated with the data element stored at the register 504.

At the next clock cycle, the data value stored at the register 504 transitions to the register 506. The data value that transitions to register 506 includes any flag that may have been set by the flag logic 508. For example, referring to the data element 302, if this element is detected to be a horizontal maximum, the flag 308 would be set. Thus, the data value can be identified as a local horizontal peak value because the flag has been set.

The system continues to clock the pre-processed data stream 414 through the detector 402 until all, or a portion, of the data elements have passed through the registers 502, 504, and 506. As a result, a pre-processed data stream with flag values 516 is produced. In the data stream 516, any data element that has been determined to represent a local horizontal maximum will have its associated flag set. The data stream 516 is then input to the vertical detection logic 404.

In one embodiment, the detection logic 402 operates as the result of the execution of instructions stored in a memory to perform the functions described herein. For example, the memory may be part of the processor 412. The instructions may be stored in the memory during manufacture of the detection system 114. In one embodiment, the instructions are stored on a computer-readable media, such as a floppy disk, hard disk, CDROM, flash memory, or any other type of computer-readable media. The instructions on the computer-readable media may be retrieved and executed by the detection system 114. In one embodiment, the instructions are downloaded from the computer-readable media into the detection system 114 and stored in the memory for later execution. Thus, in one embodiment, the detection system 114 operates to execute instructions stored on a computer-readable media to perform the functions described herein.

Figure 6:
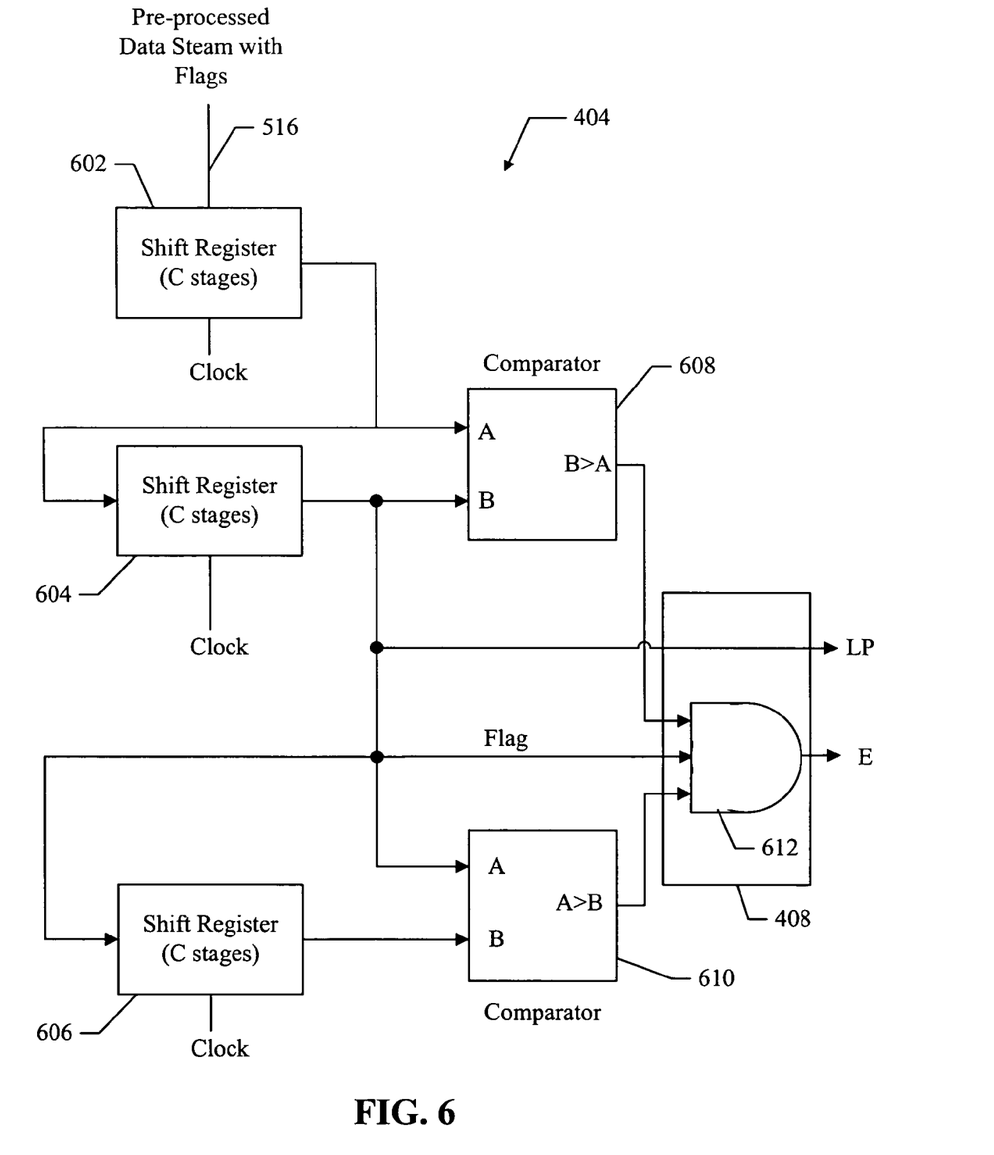
FIG. 6 shows a detail diagram of one embodiment vertical detector for use in one embodiment of a peak detection system.

FIG. 6 shows a detail diagram of one embodiment the vertical detector 404 for use in one embodiment of a peak detection system. The vertical detector 404 comprises shift registers 602, 604, 606, comparators 608, 610. Also shown is output logic 408 which comprises AND logic 612.

The registers 602, 604, 606 preferably comprise hardware logic, but may comprise hardware, software, or any combination thereof. The registers 602, 604, 606 each comprise "C" stages to provide storage for "C" data element of the pre-processed data stream 516. The value of "C" is equivalent to the number of columns in the pre-processed data array. For example, in one embodiment, the number of columns is 1024, which is related to the number of bins associated with the output of the FFT logic 204. The registers 502, 504, 506 all receive a clock signal derived from the clock 406 so that the registers operate in a synchronous fashion. For example, a data value at the input of register 602 will appear at the output of that register after 1024 clock cycles of the clock input.

The comparators 608, 610 preferably comprise hardware logic, but may comprise hardware, software, or any combination thereof. The comparators 608, 610 have inputs "A" and "B" to receive values that are compared to each other to produce an output. The comparator 608 produces an output value of "1" if the value at its B input is greater than the value at it's A input (B>A). The comparator 610 produces an output value of "1" if the value at it's A input is greater than the value at its B input (A>B).

The outputs of the comparators 608, 610 are input to the AND logic 612, which produces an output value (E) equal to "1" if all three of its inputs are "1." The third input to the AND logic 612 is a flag value associated with the data element output from register 604. The output value (E) from the AND logic 612 is used to indicate that a local maximum has been detected in the pre-processed data stream 516. For example, if the peak detection system 114 is used in a receiver, the output value (E) and local peak (LP) value may be provided to another circuit in the receiver, such as discriminator 116.

During operation of the vertical peak detector 404, the pre-processed data stream with flags 516 is input to the register 602. Clock pulses provided by the clock signal cause each element of the pre-processed data stream 516 to sequentially shift through the registers 602, 604, and 606. However, it takes "C" clock cycles to shift a data element completely through each of the registers 602, 604, and 606. After each shift, the comparators 510, 512 compare data values in the pre-processed data stream 516. The data values being compared are values that are vertically adjacent in the data array. For example, the data values are adjacent values in the Columns of the data array 300. If the data value stored at register 604 is greater than the values stored at registers 602 and 606, then a vertical peak is detected. The comparators 608 and 610 output values of "1" that cause the AND logic 612 to output (E) a value of "1" if the flag value (Flag) associated with the data element output from register 604 is set.

The system continues to clock the pre-processed data stream 516 through the detector 404 until all, or a portion, of the data elements have passed through the registers 602, 604, and 606. As a result, a pre-processed data stream with flag values 516 is processed to produce a detection of local maximums in a data array stored in memory.

In one embodiment, the detection logic 404 operates as the result of the execution of instructions stored in a memory to perform the functions described herein. For example, the memory may be part of the processor 412. The instructions may be stored in the memory during manufacture of the detection system 114. In one embodiment, the instructions are stored on a computer-readable media, such as a floppy disk, hard disk, CDROM, flash memory, or any other type of computer-readable media. The instructions on the computer-readable media may be retrieved and executed by the detection system 114. In one embodiment, the instructions are downloaded from the computer-readable media into the detection system 114 and stored in the memory for later execution. Thus, in one embodiment, the detection system 114 operates to execute instructions stored on a computer-readable media to perform the functions described herein.

Figure 7:
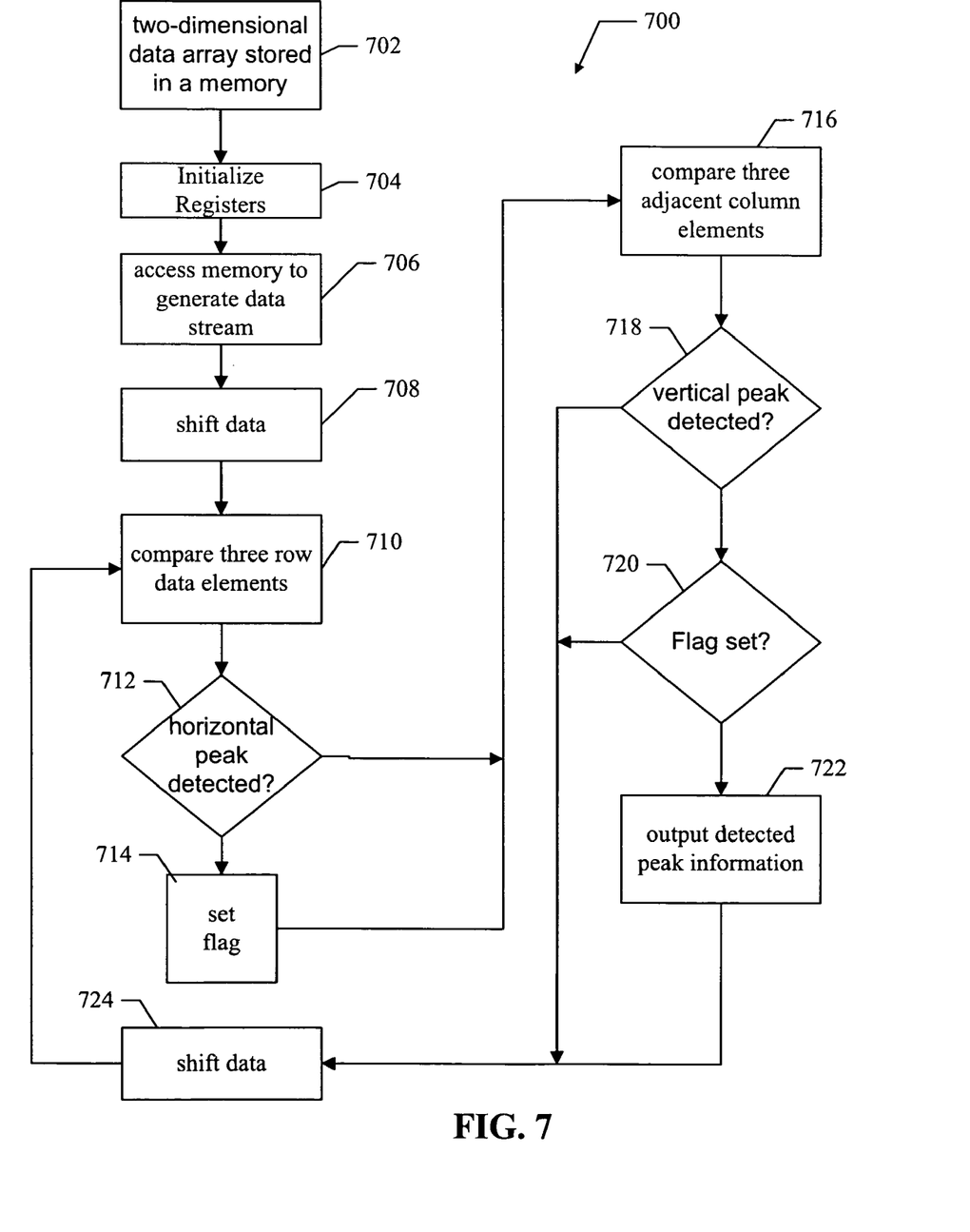
FIG. 7 shows one embodiment of a method for operating a detection system for detecting local maximums in a two-dimensional data set.

FIG. 7 shows one embodiment of a method 700 for detecting local maximums in a two-dimensional data set. The method 700 is suitable for use with one or more embodiments of a peak detection system as described herein. For the following description, it will be assumed that a receiver receives a radio signal that comprises transmissions from one or more transmitting terminals. The receiver includes one embodiment of a peak detection system as described herein. The receiver also comprises a pre-processor that operates to pre-process the received signal. For example, the receiver may be the receiver 110 shown in FIG. 1.

At block 702, a two-dimensional data array is generated that represents a received signal, which comprises transmissions from one or more transmitting terminals. The data array is stored in a memory at the receiver. For example, a pre-processor included in the receiver processes the received signal and generates the two-dimensional array that is stored in the memory. For example, in one embodiment, the pre-processor is the pre-processor 112 shown in FIG. 2.

At block 704, shift registers are initialized to begin the peak detection process. For example, in one embodiment, the peak detection system comprises horizontal and vertical detection circuits that include shift registers that are used to shift the data array to determine horizontal and vertical peaks. These registers are initialized, (i.e., cleared, or preset) or otherwise setup to handle the peak detection process.

At block 706, the memory is accessed to read-out the data array. The array is read-out element by element in an orderly fashion to create a data stream. For example, the elements are read-out across each row until all, or a portion of, rows have been read-out.

At block 708, a detection process is started that shifts elements of the data stream into the detection system. For example, a clock is used to shift each element into the detection system in a synchronous and orderly fashion.

At block 710, three horizontal elements of the data array are tested to determine if a local horizontal peak exists. For example, in one embodiment, the horizontal peak detector shown in FIG. 5 is used to compare data elements output from three registers (502, 504, 506) to detect a local horizontal peak.

At block 712, a test is performed to determine if a local horizontal peak has been detected. For example, referring to FIG. 5, comparators 510 and 512 compare a middle data element with two adjacent data elements. If the middle data element is greater than the adjacent elements, then a peak is detected and the method proceeds to block 714. If a peak is not detected, the method proceeds to block 716.

At block 714, a flag is set that is associated with the detected horizontal peak. For example, the flag logic 508 sets a flag that is part of the data element of the detected peak.

At block 716, three vertical elements of the data array are tested to determine if a local vertical peak exists. For example, in one embodiment, the vertical peak detector shown in FIG. 6 is used to compare data elements output from three registers (602, 604, 606) to detect a local vertical peak.

At block 718, a test is performed to determine if a local vertical peak has been detected. For example, referring to FIG. 6, comparators 608 and 610 compare a middle data element with two vertically adjacent data elements. If the middle data element is greater than the vertically adjacent elements, then a vertical peak is detected and the method proceeds to block 720. If a peak is not detected, the method proceeds to block 724.

At block 720, a test is performed to determine if a flag associated with the detected vertical peak is set. If the flag is set, a local peak has been detected in a data array. For example, the flag is at block 714 if a horizontal peak is detected at block 712. If the flag is set, the method proceeds to block 722, and if not, the method proceeds to block 724.

At block 722, a local peak has been detected in the data array and information about this peak is output from the detection system. For example, in one embodiment, the detection system may be part of a signal receiver and peak information detected by the detector is output to a discriminator circuit, as shown in FIG. 1. The output information contains the value of the data element that is detected to be a peak, and identifier information that identifies the location of the peak in the data array.

At block 724, the next element of the data array is shifted into the detection system for processing. For example, a clock signal is used to shift another data element from the data stream into the detection system. The method 700 continues until all, or a portion of, the data elements in the data array have been shifting into and processed by the detection system.

Thus, the method 700 describes how local peaks are detected in a data array to determine the frequency and sequence variation associated with data transmitted from a transmitting terminal. The method is suitable for use in any type of processing system that needs to detect local peaks in a data array. It should be noted that additions, changes, deletion or combination of the method steps may be performed without deviating from the scope of the embodiments.

In another embodiment, the location of local peaks in the data array is separately accounted for. For example, counters or other type of circuitry may be used to keep track of the location of local peaks in the data array. After the array is processed, the counter values are used to indicate the location of the detected peaks.

A peak detection system has been described that operates to detect local peaks in a two-dimensional data set. Accordingly, while one or more embodiments of a peak detection system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The invention claimed is:

1. Apparatus for detecting a local maximum in a two-dimensional data set, wherein the data set is represented by a stream of data elements, the apparatus comprising:
   first detection logic that receives the data stream and operates to detect a first data element that represents a peak in a first dimension of the data set; and
   second detection logic that receives the data stream and operates to detect a second data element that represents a peak in a second dimension of the data set,
   wherein a local maximum is detected if the first and second data elements are the same element.

2. The apparatus of claim 1, further comprising logic to process the data set to produce the stream of data elements.

3. The apparatus of claim 1, wherein the first detection logic further comprises flag logic to associate a flag with the first data element.

4. The apparatus of claim 1, wherein in the second detection logic further comprises logic to process the flag to determine if the first and second data elements are the same element.

5. The apparatus of claim 1, further comprising output logic that outputs information about the local maximum.

6. The apparatus of claim 5, wherein in the information about the local maximum comprises an identifier that identifies a location of the local maximum in the data set.

7. The apparatus of claim 1, wherein the first detection logic comprises first register logic that operates to receive the data stream and output selected data elements that are adjacent in the first dimension of the data set.

8. The apparatus of claim 7, wherein the first detection logic comprises comparator logic that operates to compare the selected data elements to determine the first data element, and wherein the comparator logic has an output that is coupled to the flag logic.

9. The apparatus of claim 1, wherein the second detection logic comprises register logic that operates to receive the data stream and output selected data elements that are adjacent in the second dimension of the data set.

10. The apparatus of claim 9, wherein the second detection logic comprises comparator logic to compare the selected data elements to determine the second data element.

11. The apparatus of claim 1, wherein the two-dimensional data set comprises rows and columns of data elements, and wherein the first dimension of the data set is defined by the number of columns, and the second dimension of the data set is defined by the number of rows.

12. Apparatus for detecting a local maximum in a two-dimensional data set, wherein the data set is represented by a stream of data elements, the apparatus comprising:
    means for receiving the data stream;
    means for detecting a first data element that represents a peak in a first dimension of the data set; and
    means for detecting a second data element that represents a peak in a second dimension of the data set,
    wherein a local maximum is detected if the first and second data elements are the same element.

13. The apparatus of claim 12, further comprising means for processing the data set to produce the stream of data elements.

14. The apparatus of claim 12, wherein the means for detecting the first data element farther comprises means for associating a flag with the first data element.

15. The apparatus of claim 12, wherein the means for detecting the second data element farther comprises means for processing the flag to determine if the first and second data elements are the same element.

16. The apparatus of claim 12, farther comprising means for outputting information about the local maximum.

17. The apparatus of claim 16, wherein in the information about the local maximum comprises an identifier that identifies a location of the local maximum in the data set.

18. The apparatus of claim 12, wherein the means for detecting the first data element comprises:
    means for storing a portion of the data stream; and
    means for outputting selected data elements from the stored of portion of the data stream that are adjacent in the first dimension of the data set.

19. The apparatus of claim 18, wherein the means for detecting the first data element comprises means for comparing the selected data elements to determine the first data element.

20. The apparatus of claim 12, wherein the means for detecting the second data elements comprises:
   means for storing a portion of the data stream; and
   means for outputting selected data elements from the stored of portion of the data stream that are adjacent in the second dimension of the data set.

21. The apparatus of claim 20, wherein the means for detecting the second data element comprises means for comparing the selected data elements to determine the second data element.

22. The apparatus of claim 12, wherein the two-dimensional data set comprises rows and columns of data elements, and wherein the first dimension of the data set is defined by the number of columns, and the second dimension of the data set is defined by the number of rows.

23. A method for detecting a local maximum in a two-dimensional data set, wherein the data set is represented by a stream of data elements, the method comprising:
   receiving the data stream;
   detecting a first data element in the data stream that represents a peak in a first dimension of the data set;
   associating a flag with the first data element;
   detecting a second data element in the data stream that represents a peak in a second dimension of the data set; and
   detecting a local maximum if the flag is associated with the second data element.

24. The method of claim 23, further comprising processing the data set to produce the stream of data elements.

25. The method of claim 23, further comprising outputting information about the local maximum.

26. The method of claim 23, wherein the information about the local maximum comprises an identifier that identifies a location of the local maximum in the data set.

27. The method of claim 23, wherein the step of detecting the first data element comprises:
   storing a portion of the data stream; and
   outputting selected data elements from the stored of portion of the data stream that are adjacent in the first dimension of the data set.

28. The method of claim 27, wherein the step of detecting the first data element comprises comparing the selected data elements to determine the first data element.

29. The method of claim 23, wherein the step of detecting the second data elements comprises:
   storing a portion of the data stream; and
   outputting selected data elements from the stored of portion of the data stream that are adjacent in the second dimension of the data set.

30. The method of claim 29, wherein the step of detecting the second data element comprises comparing the selected data elements to determine the second data element.

31. The method of claim 23, wherein the two-dimensional data set comprises rows and columns of data elements, and wherein the first dimension of the data set is defined by the number of columns, and the second dimension of the data set is defined by the number of rows.

32. A computer-readable media comprising instructions, which when executed by a processor, operate to detect a local maximum in a two-dimensional data set, wherein the data set is represented by a stream of data elements, the computer-readable media comprising:
   instructions for receiving the data stream;
   instructions for detecting a first data element that represents a peak in a first dimension of the data set; and
   instructions for detecting a second data element that represents a peak in a second dimension of the data set,
   wherein a local maximum is detected if the first and second data elements are the same element.

33. The computer-readable media of claim 32, farther comprising instructions for processing the data set to produce the stream of data elements.

34. The computer-readable media of claim 32, wherein the instructions for detecting the first data element further comprise instructions for associating a flag with the first data element.

35. The computer-readable media of claim 32, wherein the instructions for detecting the second data element further comprise instructions for processing the flag to determine if the first and second data elements are the same element.

36. The computer-readable media of claim 32, farther comprising instructions for outputting information about the local maximum.

37. The computer-readable media of claim 36, wherein in the information about the local maximum comprises an identifier that identifies a location of the local maximum in the data set.

38. The computer-readable media of claim 32, wherein the instructions for detecting the first data element comprise:
   instructions for storing a portion of the data stream; and
   instructions for outputting selected data elements from the stored of portion of the data stream that are adjacent in the first dimension of the data set.

39. The computer-readable media of claim 38, wherein the instructions for detecting the first data element comprise instructions for comparing the selected data elements to determine the first data element.

40. The computer-readable media of claim 32, wherein the instructions for detecting the second data elements comprise:
   instructions for storing a portion of the data stream; and
   instructions for outputting selected data elements from the stored of portion of the data stream that are adjacent in the second dimension of the data set.

41. The computer-readable media of claim 40, wherein the instructions for detecting the second data element comprise instructions for comparing the selected data elements to determine the second data element.

42. The computer-readable media of claim 32, wherein the two-dimensional data set comprises rows and columns of data elements, and wherein the first dimension of the data set is defined by the number of columns, and the second dimension of the data set is defined by the number of rows.

* * * * *